(12) United States Patent
Reshef

(10) Patent No.: US 7,760,650 B2
(45) Date of Patent: Jul. 20, 2010

(54) SCADA SYSTEM WITH INSTANT MESSAGING

(75) Inventor: Menachem Reshef, Ra'anana (IL)

(73) Assignee: IPNP Ltd., Netanya (IL)

( * ) Notice: Subject to any disclaimer, the term of this patent is extended or adjusted under 35 U.S.C. 154(b) by 795 days.

(21) Appl. No.: 11/615,023

(22) Filed: Dec. 22, 2006

(65) Prior Publication Data

US 2008/0154393 A1    Jun. 26, 2008

(51) Int. Cl.
H04L 12/26    (2006.01)
(52) U.S. Cl. ..................... 370/241; 370/242
(58) Field of Classification Search ........... 370/241, 370/242
See application file for complete search history.

(56) References Cited

U.S. PATENT DOCUMENTS

| 5,963,650 | A | 10/1999 | Simionescu et al. |
| 6,950,851 | B2 | 9/2005 | Osburn, III |
| 6,957,110 | B2 | 10/2005 | Wewalaarachchi et al. |
| 2005/0005093 | A1 | 1/2005 | Bartels et al. |
| 2006/0136583 | A1* | 6/2006 | Helmstetter et al. ......... 709/224 |
| 2007/0156253 | A1* | 7/2007 | De Silvio ....................... 700/6 |
| 2007/0163965 | A1* | 7/2007 | Wolfe .......................... 210/739 |

FOREIGN PATENT DOCUMENTS

| WO | 03/107296 A2 | 12/2003 |
| WO | 2006/116118 A1 | 11/2006 |

* cited by examiner

Primary Examiner—Melvin Marcelo
(74) Attorney, Agent, or Firm—Simon Kahn

(57) ABSTRACT

A system for supervisory control and data acquisition (SCADA) comprising: a remote terminal unit associated with a site; a SCADA hub in communication with the remote terminal unit; and at least one user station removed from the SCADA hub, the remote terminal unit being operable to: identify a change in a property at the site; and initiate communication of data regarding the changed property to the SCADA hub, the SCADA hub being operable responsive to the initiated communication to: transmit data regarding the changed property to the at least one user station by instant messaging.

20 Claims, 6 Drawing Sheets

… (1)

SCADA SYSTEM WITH INSTANT MESSAGING

BACKGROUND OF THE INVENTION

The present invention relates to the field of SCADA systems and more particularly to a SCADA system in which changes to properties at a site are pushed to users at remote locations to automatically update the human machine interface at the remote locations.

Supervisory control and data acquisition (SCADA) refers to large-scale distributed measurement and control systems. SCADA systems are used to monitor and/or control chemical, physical or transport processes, in municipal water supply systems, to control electric power distribution and generation, gas and oil pipelines, and other distributed processes. A SCADA system typically comprises: input/output signal hardware and controllers at the various sites to be monitored and/or controlled; a SCADA hub for monitoring and controlling the various sites; communication links from the various sites to the SCADA hub; and supervisory stations at locations remote from the SCADA hub in communication with the SCADA hub. A SCADA hub is often referred to as a Master Station.

Prior art systems typically operate under supervisory control from the SCADA hub. The input/output signal hardware at the various sites is often termed a remote terminal unit (RTU). The RTU at each site is in communication with one or more programmable logic controllers (PLCs), optionally to one or more Direct Data Controllers (DDC) and optionally to one or more of a variety of sensors and primarily functions to report properties of the various PLCs at the site to the SCADA hub and to adjust a set point of the various PLCs responsive to control commands received from the SCADA hub. While any and all of PLCs, DDCs and sensors may be utilized, for ease and clarity of explanation the term PLC is used throughout this document to include PLCs, DDC and sensors. Thus control of equipment at the site is controlled by the local PLC, and the RTU enables remote monitoring of properties and adjustment of a set point for the PLCs from the SCADA hub. Prior art systems typically poll the various RTUs from the SCADA hub thus uploading site property information.

The SCADA hub is equipped with a human machine interface (HMI) which presents site property data to a human operator, and through which the human operator controls the process of the various sites by adjusting set points of the PLCs as required. In a typical embodiment the HMI graphically presents the process at each of the various sites, and presents the properties of the PLCs in a graphical format. In order to alert the operator, colored indicators are typically supported to indicate nominal, cautionary and emergency conditions.

Setting up such a graphical support typically is accomplished by qualified engineering or technicians at the SCADA hub, based on information supplied by an integrator from a site visit. In particular, the HMI package typically includes a drawing program that the operator or system maintenance personnel use to prepare a graphical presentation of the properties of the PLCs to be reported from the RTU, and to enable control of the set points of the various PLCs via the RTU. Thus, the integrator functions at the site to physically configure the RTU, and to report on the configuration to the SCADA hub for conversion of the RTU based information to graphical representation. Such a system leads to a significant time lag between the site visit by the integrator and the availability of graphical representation at the SCADA hub.

It is further desirable to enable authorized personnel to review selected site properties and adjust selected set points remotely from the SCADA hub. One solution to this desire revolves around the preparation of a secured web site loaded with the appropriate HMI by the SCADA hub. Thus authorized personnel utilizing a web browser are able to access up to date information upon request from any location. Unfortunately, such solution has certain drawbacks. First, the solution requires the authorized personnel to request an update from the web browser in order to retrieve new information. Furthermore, changes at the site are not automatically reflected on the user's secured web site, since the SCADA hub polls various sites according to a predetermined schedule. Additionally, as described above, preparation of the graphical representation for the secured web site requires input from the integrator regarding properties and technical personnel to prepare the presentation.

Instant messaging (IM) is a form of communication that employs presence and availability technology as described, for example, in U.S. Pat. No. 7,123,695 the entire contents of which is incorporated herein by reference. In particular, an instant messaging network recognizes when a user is present on the network, and typically sends notification to other users when an additional user from a list becomes present on the network and available to receive instant messages. IM differs from e-mail in that text based conversations may happen in real time. Many features of e-mail, including persistency of the message, have been added to IM systems however they remain distinguished primarily by their notification of presence and availability.

What is needed, and not provided by the prior art, is a SCADA system in which changes in properties at a site are automatically transferred to a user at a location remote from the SCADA hub. Additionally, preferably the graphical representation of the site should be automatically presented without requiring technical personnel input, or requiring further input from the integrator on site.

SUMMARY OF THE INVENTION

Accordingly, it is a principal object of the present invention to overcome the disadvantages of prior art. This is provided in the present invention by a SCADA system providing updates of properties from sites to a SCADA hub automatically upon any change of properties at the site. The change in properties is sent to all authorized users associated with the site by IM. The IM client of the authorized user automatically updates the properties of a model to be displayed to the user responsive to the received IM.

The change in properties received at the SCADA hub is further stored on a database and analyzed to determine if an alarm message is to be sent to any clients.

In a preferred embodiment a plurality of models representing a range of potential sites are predefined. Each of the models allows for a maximum number of elements and further provides a means for deleting elements in accordance with the actual site. An integrator identifies the appropriate model at a site visit, loads the appropriate model into the site RTU and associates model variables with PLC registers. The contents of the PLC registers are known as the properties. In the event that one or more elements of the model are not physically present, a null indicator is set in the appropriate model variables to indicate that the elements are to be deleted.

The RTU is arranged to initially communicate properties of all variables and an identifier of the model utilized to the SCADA hub. Thus, the SCADA hub, responsive to the initial communication, selects the appropriate graphical presentation model, identifies elements present and absent at the site, configures the selected model accordingly and automatically presents the site graphical presentation with properties received from the RTU.

A user connected over a network, such as the Internet, installs and runs an instant messaging client. The instant messaging client confirms that the up to date version of the model to be utilized for the site of interest is present at the users station, and in the event that it is not present, downloads an up to date version of the model. The SCADA hub further sends by IM updates of all properties of the model. The instant messaging client automatically presents the site graphical presentation with properties received from the SCADA hub.

In the event of any change in a property at the site, the RTU sends the change in property to the SCADA hub. The SCADA hub identifies the users associated with the site, and forwards the change by IM to the instant messaging client associated with the user. Thus, the property change at the site is automatically updated at the remote user.

Each model is an object with predefined properties. Thus, the SCADA hub automatically creates graphs and reports containing the appropriate information for each site.

The invention provides for a system for SCADA comprising: a remote terminal unit associated with a site; a SCADA hub in communication with the remote terminal unit; and at least one user station removed from the SCADA hub, the remote terminal unit being operable to: identify a change in a property at the site; and initiate communication of data regarding the changed property to the SCADA hub, the SCADA hub being operable responsive to the initiated communication to: transmit data regarding the changed property to the at least one user station by instant messaging.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF PREFERRED EMBODIMENTS

Figure 1:
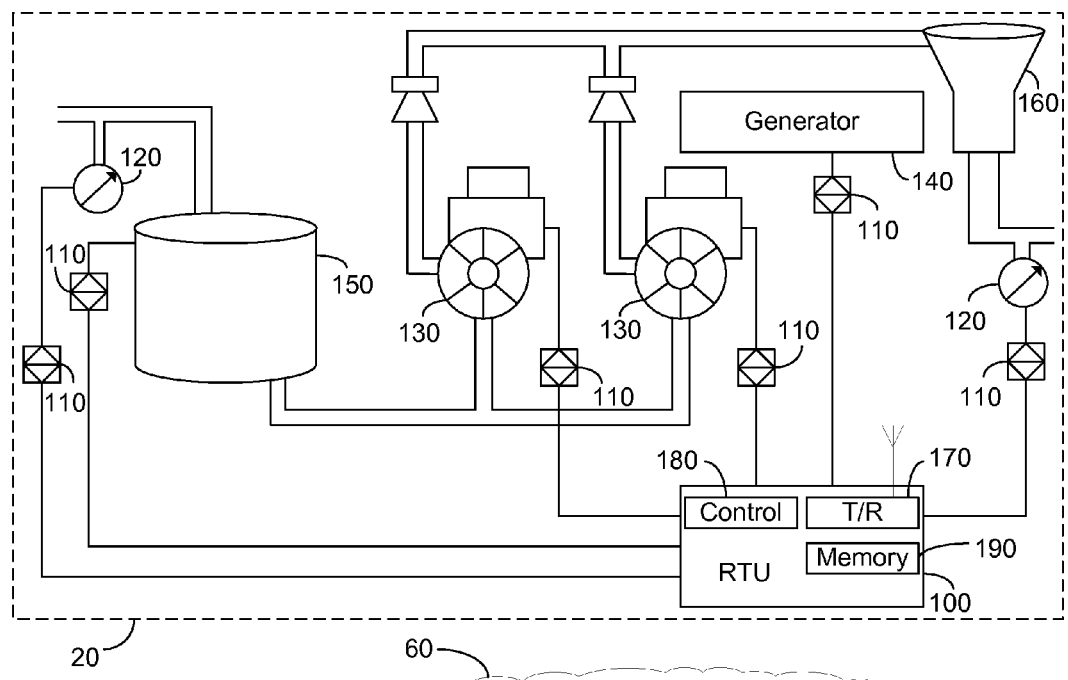
FIG. 1 illustrates a high level block diagram of a SCADA system comprising a site, a SCADA hub and a plurality of user stations exhibiting an IM client in accordance with a principle of the invention.
Figure 1:
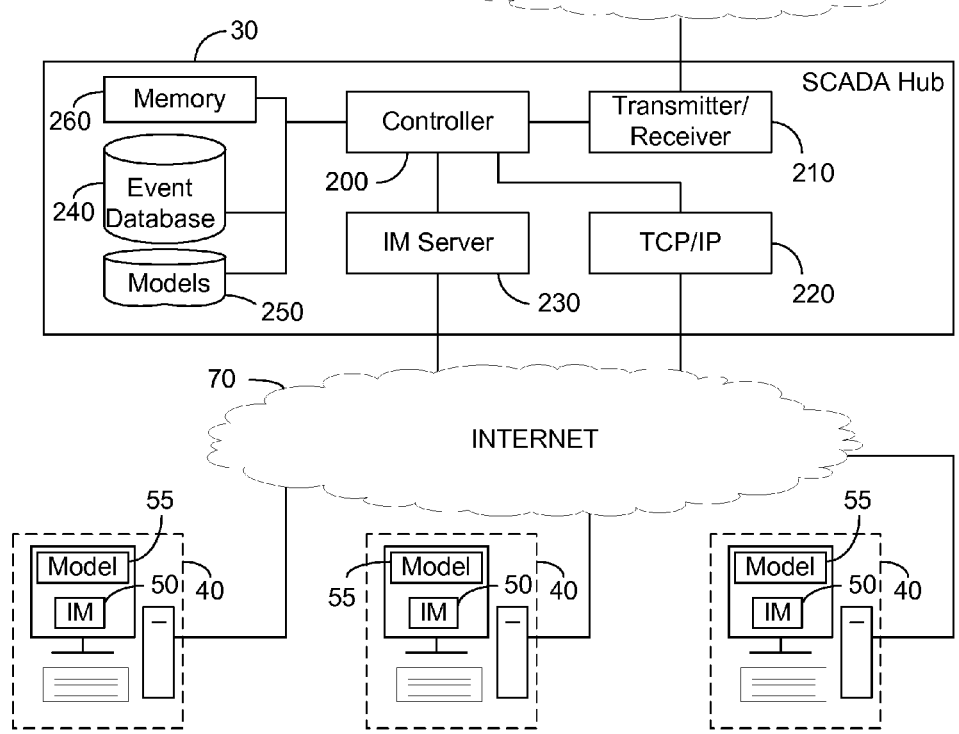

The present embodiments enable a SCADA system providing updates of properties from sites to a SCADA hub automatically upon any change of properties at the site. The change in properties is sent to all authorized users associated with the site by IM. The IM client of the authorized user automatically updates the properties and the visual animation of a model to be displayed to the user responsive to the received IM. Thus, in the event that a real time graph is displayed, the new value is automatically displayed in the real time graph.

The change in properties received at the SCADA hub is further stored on a database and analyzed to determine if an alarm message is to be sent to any clients.

In a preferred embodiment a plurality of models representing a range of potential sites are predefined. Each of the models allows for a maximum number of elements and further provides a means for deleting elements in accordance with the actual site. An integrator identifies the appropriate model at a site visit, loads the appropriate model into the site RTU and associates model variables with PLC registers. The contents of the PLC registers are known as the properties. In the event that one or more elements of the model are not physically present, a null indicator is set in the appropriate model variables to indicate that the elements are to be deleted.

The RTU is arranged to initially communicate properties of all variables and an identifier of the model utilized to the SCADA hub. Thus, the SCADA hub, responsive to the initial communication, selects the appropriate graphical presentation model, identifies elements present and absent at the site, configures the selected model accordingly and automatically presents the site graphical presentation with properties received from the RTU.

A user connected over a network, such as the Internet, installs and runs an instant messaging client. The instant messaging client confirms that the up to date version of the model to be utilized for the site of interest is present at the users station, and in the event that it is not present, downloads an up to date version of the model. The SCADA hub further sends by IM updates of all properties of the model. The instant messaging client automatically presents the site graphical presentation with properties received from the SCADA hub.

In the event of any change in a property at the site, the RTU sends the change in property to the SCADA hub. The SCADA hub identifies the users associated with the site, and forwards the change by IM to the instant messaging client associated with the user. Thus, the property change at the site is automatically updated at the remote user.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1 illustrates a high level block diagram of a SCADA system 10 in accordance with a principle of the invention comprising: a site 20; a SCADA hub 30; a plurality of user stations 40 each exhibiting an IM client 50 and a model 55; a cellular network 60; and an Internet 70. Site 20 comprises an RTU 100; a plurality of PLCs 110; a plurality of gauges 120; a plurality of pumps 130; a generator 140; a reservoir 150 and a water tower 160. RTU 100 comprises a transmitter/receiver 170, a controller 180 and a memory 190. SCADA hub 30 comprises: a controller 200; a transmitter/receiver 210; a TCP/IP functionality 220; an IM server 230; an event log database 240; a models database 250; and a memory 260.

RTU 100 of site 20 is connected to each PLC 110. Each of the plurality of pumps 130 and gauges 120, generator 140, reservoir 150 and water tower 160 exhibits a respective associated PLC 110. Controller 180 of RTU 100 is connected to memory 190 and transmitter/receiver 170, and transmitter/receiver 170 exhibits a connection to cellular network 60 illustrated as an antenna.

Controller 200 of SCADA hub 30 is in communication with each of transmitter/receiver 210, TCP/IP functionality 220, IM server 230, event log database 240, models database 250 and memory 260. Transmitter/receiver 210 is operably connected to cellular network 60. TCP/IP functionality 220 and IM server 230 are each connected to Internet 70. Each user station 40 exhibits a connection to Internet 70.

The above has been described in an embodiment in which communication between RTU 100 and SCADA hub 30 is over cellular network 60, however this is not meant to be limiting in any way. In another embodiment, communication between RTU 100 and SCADA hub 30 is over an Internet Protocol (IP) network, including without limitation an IEEE 802.3 network, also known as an Ethernet network, a WI-FI network and a WI-Max network.

In operation, RTU 100 controls each element of site 20 via the associated PLC 110. In particular controller 180 stores an association between model variables and register locations of a particular PLC 110 on memory 190. Memory 190 further comprises a unique identifier for RTU 100. RTU 100 is operable to set register values of the associated PLC 110 so as to control the associated elements such as one of pump 130, gauge 120, generator 140, reservoir 150 and water tower 160. RTU 100 is further operable to read a property of pump 130, gauge 120, generator 140, reservoir 150 and water tower 160 by reading the appropriate register of the associated PLC 110. RTU 100 is further operable to monitor a set of properties, and in the event of a change in any monitored property, to initiate a communication to SCADA hub 30 via cellular network 60 comprising data indicative of the changed property; the changed property being reported as a change in the variable of a particular model selected by an integrator from a plurality of predefined models as will be described further hereinto below.

In one embodiment the revised property is communicated to SCADA hub 30 and in another embodiment the change in property is communicated to SCADA hub 30. The communication from RTU 100 is accomplished via transmitter/receiver 170 and is accompanied with the unique identifier of RTU 100. Preferably, as will be explained further hereinto below, integrity of the communication of the revised property is ensured by use of a cyclic redundancy check (CRC) on all properties. RTU 100 is further operable to receive revised set points from SCADA hub 30, and in response change register values of one or more PLCs 110 to effect the change in set point. The appropriate registers to change are determined responsive to the association between model variables and PLC 110 registers stored in memory 190.

System 10 is illustrated as providing communication between SCADA hub 30 and site 20 via cellular network 60, however this is not meant to be limiting in any way. Communication between SCADA hub 30 and site 20 may be via a direct serial or modem connection, a network link of a local area network or a wide area network without exceeding the scope of the invention.

System 10 is illustrated as exhibiting a single site 20, however this is for sake of clarity only and is not meant to be limiting in any way. Multiples sites 20 are supported by SCADA hub 30 without exceeding the scope of the invention.

The transmission of data indicative of the changed property is received by transmitter/receiver 210 of SCADA hub 30, and the received data is transferred to controller 200. Controller 200 is operable to determine, via IM server 230, the user stations 40 which are logged on and have access to the particular site 20 information and to associate the received data, by virtue of the RTU identifier, with a particular site 20. Controller 200 is further operative to broadcast data indicative of the changed property associated with a site identifier to each of the user stations 40 which are logged on and have access. Thus, changes in one or more properties transmitted by RTU 100 from site 20 are automatically forwarded by instant messaging to user station 40.

The above has been described as having a single level of authorization per site, i.e. a user station 40 which has access rights to information regarding a particular site 20 will receive access to all parts of the particular site 20, however this is not meant to be limiting in any way. Multiple layers of authorization may be implemented, in which certain authorized users receive certain properties not accessible to other users, without exceeding the scope of the invention.

The above has been described as utilizing instant messaging, however this is not meant to be limiting in any way. Any means of communication for which presence of a user station 40 is identified and for which communication of a property is automatically received at a remote user station 40 and can be integrated with a model representation is including in the term instant messaging.

Controller 200 is further operable to store the changed property on event log database 240, and to communicate a current model appropriate for site 20 to user station 40 for display as model 55. In a preferred embodiment model 55 is transmitted by TCP/IP functionality 220. Controller 200 stores lists of authorizations, and an association between an identifier for each RTU 100 and an identifier for each site 20 in memory 260. Controller 200 is thus operable to receive data from each RTU 100, associate the data with the site 20, and communicate the data by instant messaging to the appropriate user stations 40.

User station 40 is operable to load an IM client 50, and login via IM client 50, thus indicating presence to IM server 230. As indicated above, controller 200 polls IM client 50 to identity if user station 40 contains a current version of the appropriate model for site 20. If user station 40 does not contain the current version of the appropriate model, controller 200 is operable to download the appropriate model 55 to user station 40.

In accordance with a principle of the current invention, a plurality of predefined models are stored on models database 250, the plurality of predefined models being configurable to represent a large plurality of layouts of sites 20. Thus, for example, a particular model may comprise a large plurality of pumps arrayed in a parallel arrangement, however in a manner that will be described further hereinto below, the particular model is automatically modified, responsive to delete indications, to remove elements that are not present. The visual representation of the associated site 20 is adjusted in conformance with the delete indicators to display an appropriate model for the actual layout of site 20.

Controller 200 is further operable to transmit data regarding the properties of site 20 to user station 40, preferably by instant messaging utilizing IM server 230. User station 40 is thus operable to display a representation of site 20 responsive to the received properties as model 55. Property changes at site 20 are received via IM client 50 and automatically update the downloaded model 55 resulting in an updated display. In the event the property change results in an alarm or warning condition, the alarm or warning condition is displayed by model 55. Model 55 preferably exhibits animation and or graphs which assist in the visual presentation, and are automatically updated responsive to property changes received via IM client 50.

In the event that a user at user station 40 adjusts a set point of site 20 via model 55, the adjusted set point is transmitted via IM client 50 to IM server 230. Controller 200, responsive to set point adjustment, determines in cooperation with the association stored on memory 260, the unique RTU identifier associated with the site 20 whose set point is to be adjusted, and transmits via transmitter/receiver 210 the set point adjustment to RTU 100. Transmitter/receiver 170 receives the transmitted set point adjustment, and transfers the received set point adjustment to controller 180. Controller 180, in cooperation with the association between model variables and PLC 110 registers stored in memory 190, loads the appropriate register of the particular PLC 110 with the revised set point.

Figure 2:
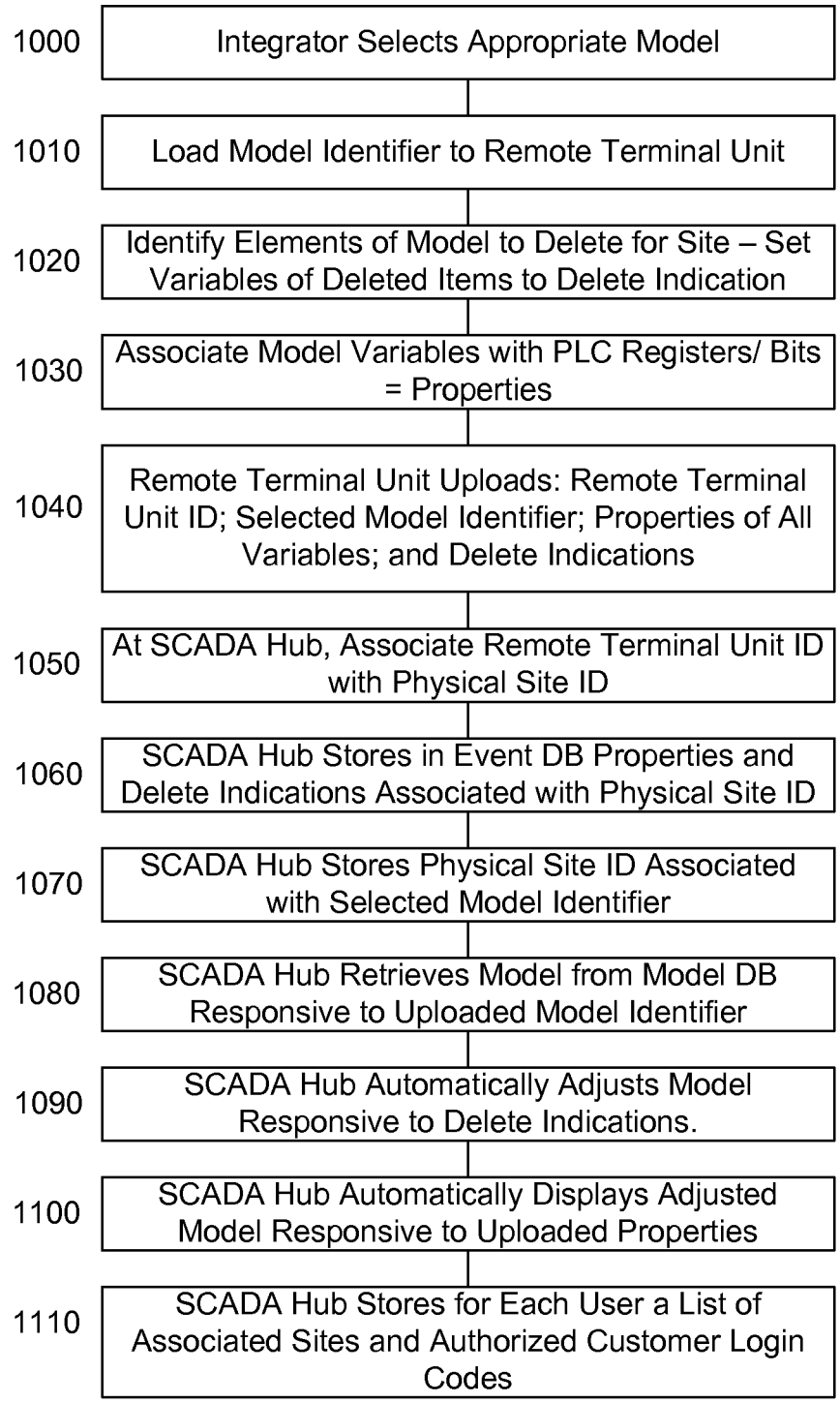
FIG. 2 illustrates a high level flow chart of the operation of an integrator to initially set up a site, and the operation of the SCADA hub to receive an initial communication from the site and associate the site with the appropriate customer ID and user stations in accordance with a principle of the invention.

FIG. 2 illustrates a high level flow chart of the operation of an integrator to initially set up a particular site 20, and the operation of a SCADA hub 30 to receive an initial communication from site 20 and associate site 20 with the appropriate customer ID and a user station 40, or user stations 40, in accordance with a principle of the invention. In stage 1000, an integrator visits site 20, and selects the appropriate model from the plurality of predefined models for site 20. In stage 1010, the integrator loads the identifier for the selected model into RTU 100 of site 20, and stores it on memory 190. In stage 1020, the integrator further identifies elements of the selected model which do not appear at the site and sets variables of the model to indicate that these elements are to be deleted.

In stage 1030, the integrator associates variable models with registers of particular PLCs 110, and/or particular bits in particular registers of particular PLCs 110. The association is stored in memory 190, and is utilized to convert properties from register values to model variables for both reporting property changes and adjusting set points.

In stage 1040, RTU 100 uploads the unique identifier for the particular RTU 100, the identifier for the selected model loaded in stage 1010, properties of all model variables and delete indications set in stage 1020. In a preferred embodiment the upload communication is initiated by RTU 100, and is further accompanied by a CRC.

In stage 1050, SCADA hub 30 receives the uploaded communication from RTU 100, and associates the unique identifier for the particular RTU 100 with a physical site identifier. In an exemplary embodiment, the integrator notifies SCADA hub 30 personnel of the site ID and RTU 100 unique identifier. The association is stored on memory 260. In stage 1060, SCADA hub 30 stores the uploaded properties for all model variables and delete indications on event log database 240 associated with the physical site identifier of stage 1050. In stage 1070, SCADA hub 30 stores the uploaded identifier for the selected model associated with the physical site identifier on memory 260.

The above has been described in an embodiment in which the association between the unique identifier for the particular RTU 100 with a physical site identifier and model information is stored on memory 260, however this is not meant to be limiting in any way. One or more of the associations between the unique identifier for the particular RTU 100 with a physical site identifier and model information may be alternatively stored on one of models database 250 and event log database 240 without exceeding the scope of the invention.

In stage 1080, SCADA hub 30 retrieves the model identified in the upload of stage 1040 from model database 250. In stage 1090, SCADA hub 30 automatically adjusts the retrieved model responsive to the uploaded delete indications. In particular, elements of the retrieved model which are not physically represented at site 20 are removed, and the appropriate connections between elements are adjusted responsive to the delete indications. In stage 1100, SCADA hub 30 displays the adjusted model of stage 1090 with the variable properties as uploaded in stage 1040. Thus, the display of a model of site 20 is adjusted and set to the current properties automatically without requiring technician input.

Stages 1080-1100 are optional, and are presented to assist in the understanding of the flow of information. There is no requirement that the model be displayed at the SCADA hub.

In stage 1110, SCADA hub 30 stores for each user a list of associated sites, authorized customer IDs and login codes. In a preferred embodiment the list is stored on memory 260. The list of associated sites and authorized customer IDs and login codes is utilized as described above, and further hereinto below, to associate each user station 40 with the appropriate site, or sites, 20 for which properties are to be sent.

Thus, the method of FIG. 2 configures RTU 100 for operation, associates a particular RTU 100, with a physical site identifier, and further prepares and supplies sufficient information to SCADA hub 30 to display a model of site 20 without requiring technician input at SCADA hub 30.

Figure 3:
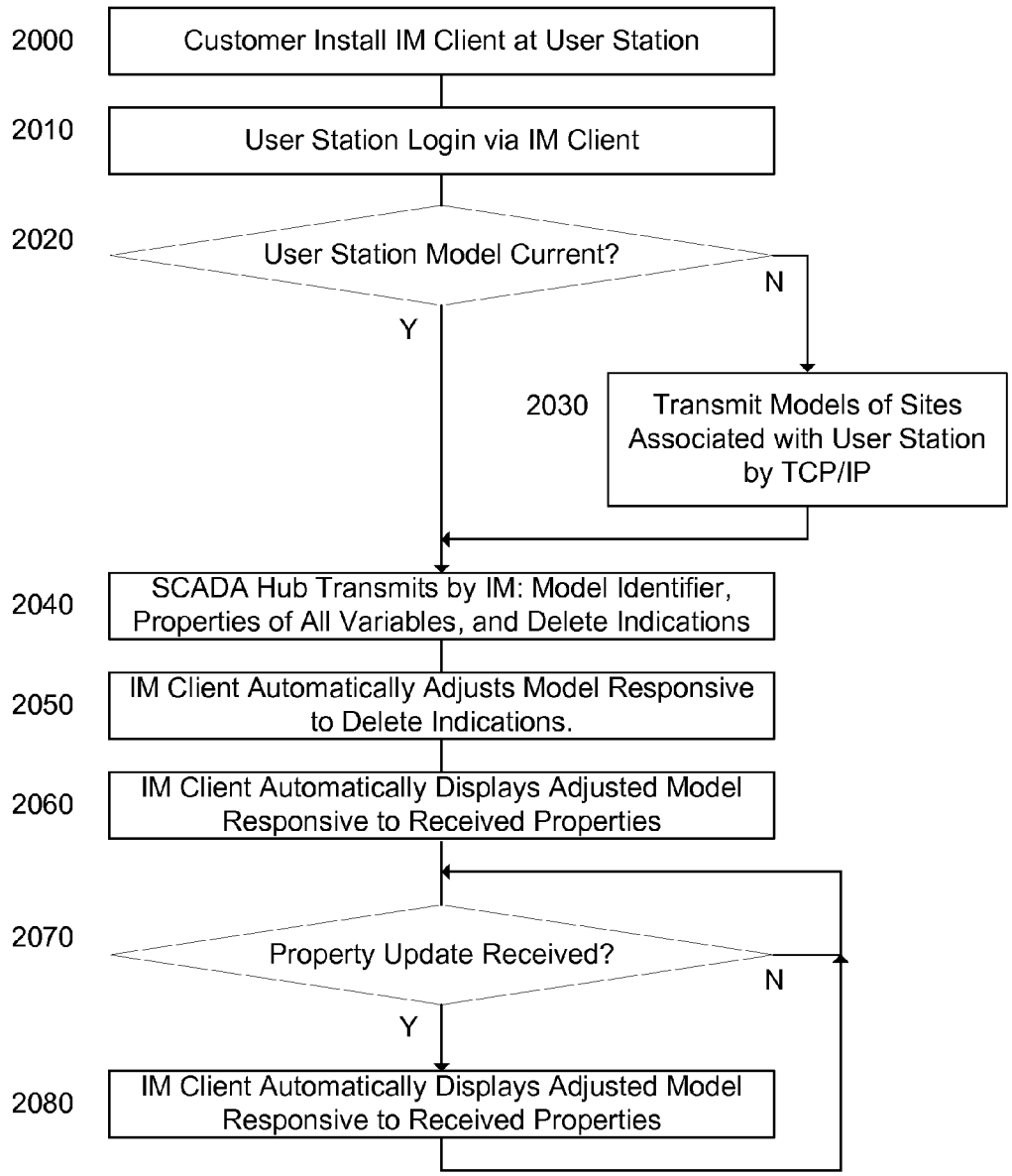
FIG. 3 illustrates a high level flow chart of the operation of the SCADA hub to transfer appropriate models and properties to user stations in accordance with a principle of the invention.

FIG. 3 illustrates a high level flow chart of the operation of SCADA hub 30 to transfer appropriate models and properties to user stations 40 in accordance with a principle of the invention. In stage 2000, a customer or user installs IM client 50 at user station 40. In stage 2010, user station 40 logs in to IM server 230 via IM client 50. Controller 200, in cooperation with IM server 230 and memory 260 identifies the appropriate sites 20 associated with user of user station 40, and the selected model associated therewith.

In stage 2020, controller 200, via IM server 230, queries user station 40 to identify if model 55 on user station 40 is the appropriate model and if it is current. It is to be noted that the models stores on models database 250 may be updated as required, and the operation of stage 2020 ensures that all models 55 are current. If no model 55 is present on user station 40, it is equivalent to the model not being current.

In the event that model 55 on user station 40 is not current, in stage 2030 the appropriate model or models for site 20, or sites 20, is uploaded from SCADA hub 30 to user station 40. In a preferred embodiment, model 55 is uploaded via TCP/IP functionality 220.

In the event that in stage 2020 model 55 on user station 40 is current, or after stage 2030, in stage 2040 SCADA hub 30 transmits by immediate messaging the model identifier, properties of all variables and delete indications. In stage 2050, IM client 40 automatically adjusts model 55 of stage 2030 responsive to the transmitted delete indications. In particular, elements of model 55 which are not physically represented at site 20 are removed, and the appropriate connections between elements are adjusted responsive to the delete indications. In stage 2060, IM client 40 displays the adjusted model 55 of stage 2050 with the variable properties as received by instant messaging in stage 2040. Thus, the display of model 55 of site 20 is adjusted and set to the current properties automatically without requiring technician input.

In stage 2070, IM client 40 awaits a change in a property of any variable of model 55. In the event that a property update is not received, stage 2070 is repeated. In the event that a change in property is received by instant messaging by IM client 50, in stage 2080, IM client 40 automatically displays model 55 with the adjusted variable properties as received by instant messaging in stage 2070.

Thus, the method of FIG. 3 downloads a current version of the selected model for each site for which user station 40 is associated by SCADA hub 30, and further displays the site in accordance with properties uploaded by RTU 100 in the method of FIG. 2. Changes in properties are received by instant messaging, and automatically adjust the model in accordance with the changed properties.

Figure 4:
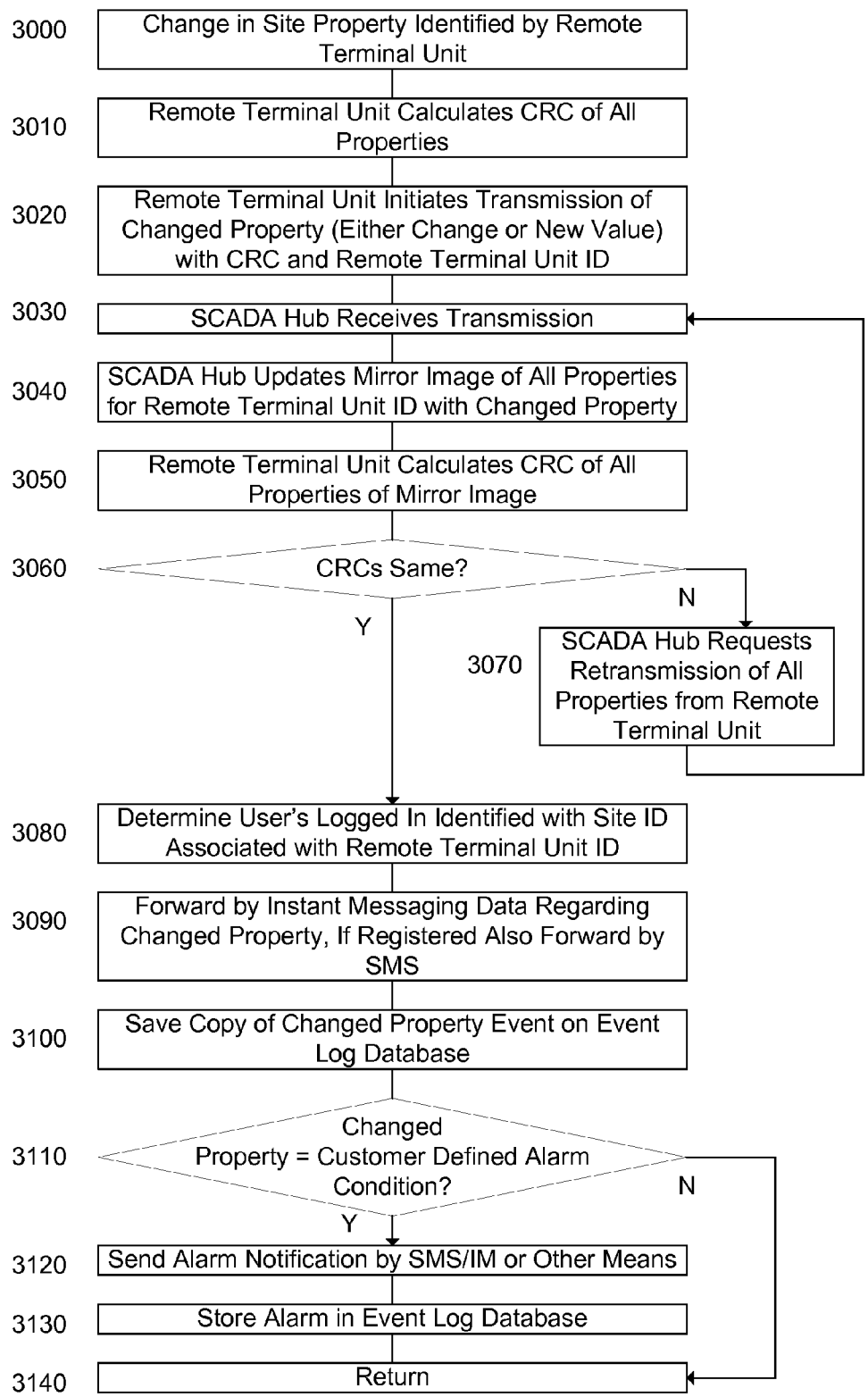
FIG. 4 illustrates a high level flow chart of the operation of the SCADA hub to push changes in properties received from a site by instant messaging to user stations in accordance with a principle of the invention.

FIG. 4 illustrates a high level flow chart of the operation of SCADA hub 30 to push changes in properties received from RTU 100 by instant messaging to user stations 40 in accordance with a principle of the invention. In stage 3000, a change in one or more property at site 20 is identified by RTU 100. As described above, a property is defined as a particular register, or one or more bits of a register of a particular PLC 110. The property is associated with a particular variable of a selected model as described above in relation to FIG. 2.

In stage 3010, RTU 100 calculates a CRC of all properties in order to ensure data integrity. In stage 3020, RTU 100 initiates transmission of the changed property to SCADA hub 30, the CRC of stage 3010 and the identifier of RTU 100. In one embodiment the revised property is communicated to SCADA hub 30 and in another embodiment the change in property is communicated to SCADA hub 30.

In stage 3030, SCADA hub 30 receives the initiated transmission of stage 3020. In stage 3040, SCADA hub 30 updates the mirror image of the properties of RTU 100 stored on event log database 240 with the change property. In stage 3050, RTU 100 calculates a CRC of the mirror image properties. In stage 3060 the calculated CRC of stage 3050 is compared with the transmitted CRC of stage 3020. In the event that the CRCs are not equal in stage 3070, SCADA hub 30 requests a retransmission of all properties from RTU 100, and stage 3030 as described above is performed.

In the event that in stage 3060 the CRC are equal, which is indicative that data integrity has been maintained, in stage 3080 the users logged in via IM server 230 associated with the RTU 100 are determined. The association is determined in cooperation with the RTU 100 identifier as described above in the method of FIG. 2.

In stage 3090, data regarding the changed property transmitted by RTU 100 in stage 3020 is forwarded by instant messaging to IM client 50 of user station 40 determined in stage 3080. In a preferred embodiment the data regarding the changed property comprises the data received in stage 3030. In the event that a user profile stored in memory 260 so indicates, the change in property may be further transmitted by short messaging or other communication means without exceeding the scope of the invention.

In stage 3100, the changed property is stored on event log database 240. In stage 3110, the changed property is reviewed to identify if the property change is defined as a customer alert. The definition of customer alerts is part of the user profile known to the prior art.

In the event that the changed property is a customer defined alarm condition, in stage 3120 an alarm notification is transmitted per the user profile by any of instant messaging, short messaging service, telephone messaging and beeper. In stage 3130 the alarm condition is stored on event log database 240. In stage 3140 the routine returns. In the event that in stage 3110 the changed property is not a customer defined alarm condition, in stage 3140 the routine returns.

Thus, the method of FIG. 4 receives changes in properties from RTU 100, with RTU 100 initiating the communication. The changes in properties are forwarded automatically by instant messaging to user stations associated with the RTU 100. As described above in relation to FIG. 3, the received changes in properties automatically adjust the display of model 55 at user station 40.

Figure 5:
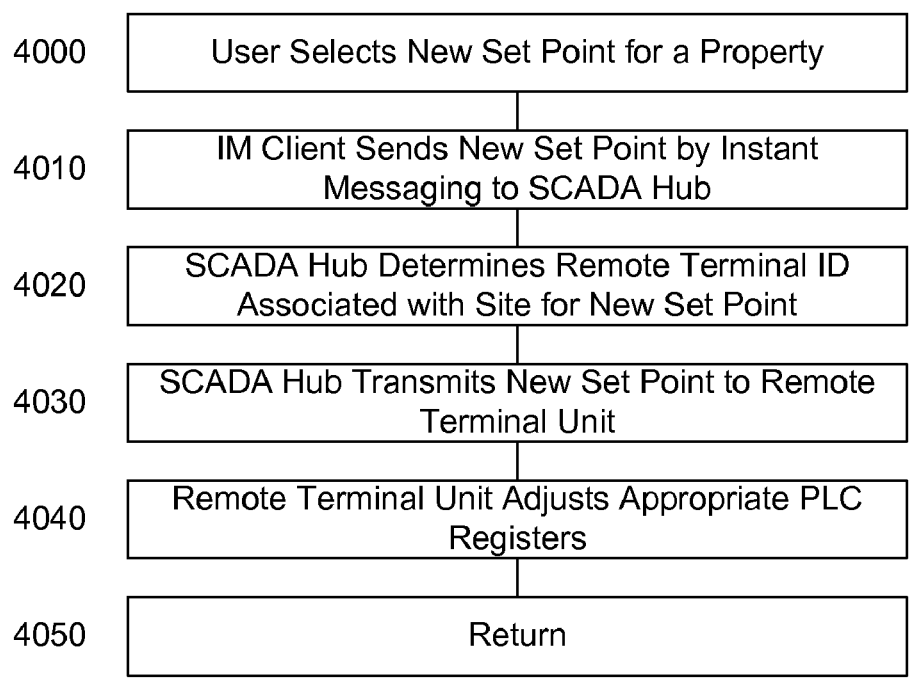
FIG. 5 illustrates a high level flow chart of the operation of a user station to change a property of a site in accordance with a principle of the invention.

FIG. 5 illustrates a high level flow chart of the operation of a user station 40 to change a property of a site 20 in accordance with a principle of the invention. In stage 4000, a user selects a new set point for a property of model 55. In stage 4010, IM client 50 sends the selected new set point by instant messaging to IM server 230 of SCADA hub 30. In stage 4020, controller 200 of SCADA hub 30, in cooperation with the associated list stored on memory 260 as described above in relation to FIG. 2, determines the RTU 100 identifier associated with the particular site 20 for which the new set point is destined.

In stage 4030, controller 200 transmits the new set point to the appropriate RTU 100 via transmitter/receiver 210. In stage 4040, RTU 100 responsive to the transmitted new set point, and in cooperation with the stored association between variable models and registers of particular PLCs 110 as described above in relation to FIG. 2, adjusts appropriate PLC 110 registers to implement the received set point. In stage 4050 the routine returns.

Thus, the method of FIG. 5 transmits set point changes by instant messaging from user station 40 to SCADA hub 30, and SCADA hub 30 directs the set point changes to the appropriate RTU 100 for implementation in the appropriate PLC 110 register.

Figure 6:
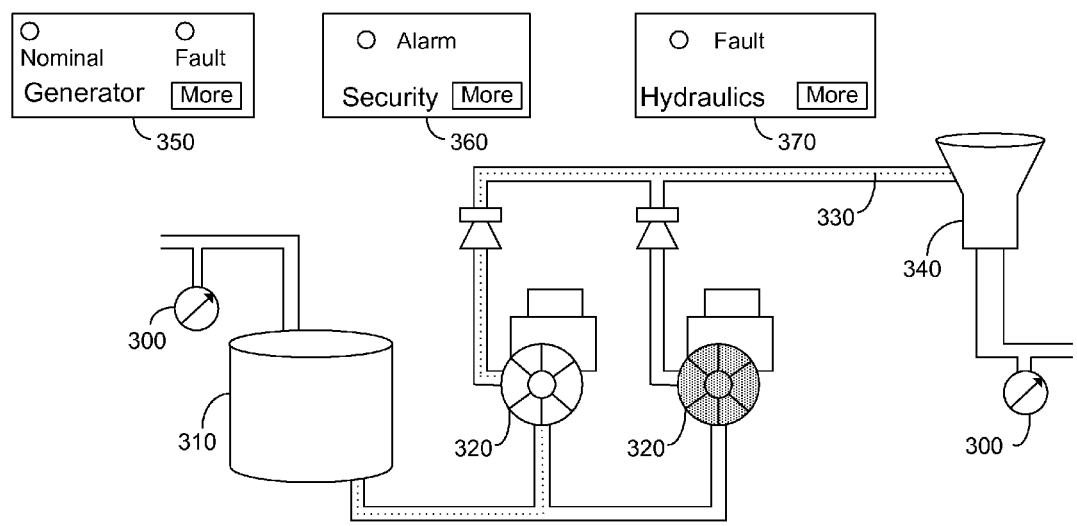
FIG. 6 illustrates a presentation of a site as seen at the user station in accordance with a principle of the invention.

FIG. 6 illustrates a presentation of a site 20 as seen at a user station 40 as model 55 in accordance with a principle of the invention. Model 55 illustrates a representation of a plurality of gauges 300; a representation of a reservoir 310; a representation of a first and a second pump 320; a flow indication 330; a representation of a water tower 340; a generator status indicator 350; a security indicator 360; and a hydraulics indicator 370. Flow indication 330 provides a visual indication of fluid flowing direction. Representation of first pump 320 is indicative of nominal operation, whereas representation of second pump 320 is colored red to indicate a failure or off condition. It is to be noted that flow indication 330 is responsive to the respective conditions of first and second pump 320.

In a preferred embodiment flow indication 330 is an animation of flow, thus visually indicating direction of flow, levels and other parameters as required.

Thus, the present embodiments enable a SCADA system providing updates of properties from sites to a SCADA hub automatically upon any change of properties at the site. The change in properties is sent to all authorized users associated with the site by IM. The IM client of the authorized user automatically updates the properties and the visual animation of a model to be displayed to the user responsive to the received IM. Thus, in the event that a real time graph is displayed, the new value is automatically displayed in the real time graph..

The change in properties received at the SCADA hub is further stored on a database and analyzed to determine if an alarm message is to be sent to any clients.

In a preferred embodiment a plurality of models representing a range of potential sites are predefined. Each of the models allows for a maximum number of elements and further provides a means for deleting elements in accordance with the actual site. An integrator identifies the appropriate model at a site visit, loads the appropriate model into the site RTU and associates model variables with PLC registers. The contents of the PLC registers are known as the properties. In the event that one or more elements of the model are not physically present, a null indicator is set in the appropriate model variables to indicate that the elements are to be deleted.

The RTU is arranged to initially communicate properties of all variables and an identifier of the model utilized to the SCADA hub. Thus, the SCADA hub, responsive to the initial communication, selects the appropriate graphical presentation model, identifies elements present and absent at the site, configures the selected model accordingly and automatically presents the site graphical presentation with properties received from the RTU.

A user connected over a network, such as the Internet, installs and runs an instant messaging client. The instant messaging client confirms that the up to date version of the model to be utilized for the site of interest is present at the users station, and in the event that it is not present, downloads an up to date version of the model. The SCADA hub further sends by IM updates of all properties of the model. The instant messaging client automatically presents the site graphical presentation with properties received from the SCADA hub.

In the event of any change in a property at the site, the RTU sends the change in property to the SCADA hub. The SCADA hub identifies the users associated with the site, and forwards by IM the change to the instant messaging client associated with the user. Thus, the property change at the site is automatically updated at the remote user.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description and which are not in the prior art.

I claim:

1. A system for supervisory control and data acquisition (SCADA) comprising:
   a remote terminal unit associated with a site;
   a SCADA hub in communication with said remote terminal unit; and
   at least one user station removed from said SCADA hub, said remote terminal unit being operable to:
      identify a change in a property at the site;
      calculate a cyclic redundancy check (CRC) on all properties of the site; and
      initiate communication of data regarding the changed property to said SCADA hub, said initiated communication comprising said calculated CRC,
   said SCADA hub being operable responsive to said initiated communication to:
      transmit data regarding the changed property to said at least one user station by instant messaging.

2. A system according to claim 1, wherein said at least one user station is further operable, responsive to said transmitted data received via instant messaging to update at least one variable of a model representative of the site.

3. A system according to claim 1, wherein said communication of data regarding the changed property comprises one of a revised value of said property and a change in value of said property.

4. A system according to claim 1, wherein said SCADA hub comprises an event database, said SCADA hub being further operable responsive to said initiated communication to store a representation of said data regarding the changed property on said event database.

5. A system according to claim 1, wherein said initiated communication of data regarding the changed property to said SCADA hub is over an Internet protocol network.

6. A system according to claim 1, wherein said SCADA hub comprises a database, and wherein said SCADA hub is further operable to store data responsive to all initiated communication from said remote terminal unit on said database, said database thereby comprising an image of said properties of remote terminal unit, said SCADA hub being further operable to:
   calculate a CRC on said image of said properties;
   compare said calculated CRC of said image with said communicated CRC; and
   in the event said calculated CRC does not match said communicated CRC, request transmission of all properties from said remote terminal unit.

7. A system according to claim 1, wherein said system comprises a plurality of models, each of said models comprising a plurality of elements, said remote terminal being configurable to store an identification of a particular model of said plurality of models and an associate site properties with variable of said particular model.

8. A system according to claim 7, wherein said remote terminal is further operable to initiate communication of data regarding said identification of a particular model to said SCADA hub, said SCADA hub being operable to associate said site with said particular model.

9. A system according to claim 8, wherein said SCADA hub is operable responsive to said communication of data regarding said identification of the particular model, to transmit the particular model to said at least one user station.

10. A method of displaying site properties at a remote client, said method comprising:

providing a SCADA hub;

identifying a change in a property at the site;

calculating a cyclic redundancy check (CRC) on all properties of the site;

initiating communication of data regarding the changed property to said provided SCADA hub, said initiated communication comprising said calculated CRC; and transmitting data regarding the changed property by instant messaging.

11. A method according to claim 10, further comprising:

receiving by instant messaging said transmitted data regarding the changed property; and updating at least one variable of a model representative of the site responsive to said data received by instant messaging.

12. A method according to claim 11, wherein said model representative of the site comprises at least one of animation and graphs.

13. A method according to claim 10, wherein said communication of data regarding the changed property comprises one of a revised value of said property and a change in value of said property.

14. A method according to claim 10, further comprising:

storing a representation of said data regarding the changed property at said provided SCADA hub.

15. A method according to claim 10, wherein said initiated communication of data regarding the changed property to said SCADA hub is over a IP network.

16. A method system according to claim 10, further comprising:

calculating a CRC on an image of said properties;

comparing said calculated CRC of said image with said communicated CRC; and in the event said calculated CRC does not match said communicated CRC, requesting transmission of all properties.

17. A method according to claim 10, further comprising:

storing an identification of a particular model of a plurality of pre-determined models; and associating site properties with variables of said particular model.

18. A method according to claim 17, further comprising:

initiating communication of data regarding said identification of a particular model to said provided SCADA hub.

19. A method according to claim 18, further comprising:

transmitting the particular model responsive to said communicated data regarding said identification of a particular model.

20. A method according to claim 19, further comprising:

automatically creating graphs from said transmitted particular model.

* * * * *